United States Patent [19]

Schwemmer

[11] Patent Number: 5,255,065
[45] Date of Patent: Oct. 19, 1993

[54] CONICALLY SCANNED HOLOGRAPHIC LIDAR TELESCOPE

[75] Inventor: Geary Schwemmer, Hampstead, Md.

[73] Assignee: The United States of America as represented by the Administrator of the National Aeronautics and Space Administration, Washington, D.C.

[21] Appl. No.: 848,885

[22] Filed: Mar. 10, 1992

[51] Int. Cl.⁵ .......................... G01C 3/08; G02B 5/32
[52] U.S. Cl. ........................................ 356/5; 359/17; 359/18
[58] Field of Search ................... 359/17, 18; 356/5

[56] References Cited

U.S. PATENT DOCUMENTS

| | | |
|---|---|---|
| 4,639,070 | 1/1987 | Ikeda et al. |
| 4,768,847 | 9/1988 | Iwaoka et al. ............ 350/3.71 |
| 4,832,426 | 5/1989 | Käser ........................ 350/3.72 |
| 4,923,262 | 5/1990 | Clay ......................... 350/3.71 |
| 4,925,262 | 5/1990 | Yamagishi et al. ........ 350/3.71 |
| 4,957,336 | 9/1990 | Hasegawa et al. ........ 350/3.71 |
| 5,009,502 | 4/1991 | Shih et al. ................. 356/152 |
| 5,064,258 | 11/1991 | Inokuchi et al. |

*Primary Examiner*—Stephen C. Buczinski
*Attorney, Agent, or Firm*—Paul S. Clohan, Jr.; R. Dennis Marchant; Guy M. Miller

[57] ABSTRACT

An optical scanning device utilizing a source of optical energy such as laser light backscattered from the earth's atmosphere or transmitted outward as in a lidar, a rotating holographic optical element having an axis of rotation perpendicular to the plane of its substrate, and having a stationary focus which may or may not be located on its axis of rotation, with the holographic optical element diffracting the source of optical energy at an angle to its rotation axis enabling a conical scanning area and a motor for supporting and rotating the rotating holographic optical element.

15 Claims, 5 Drawing Sheets

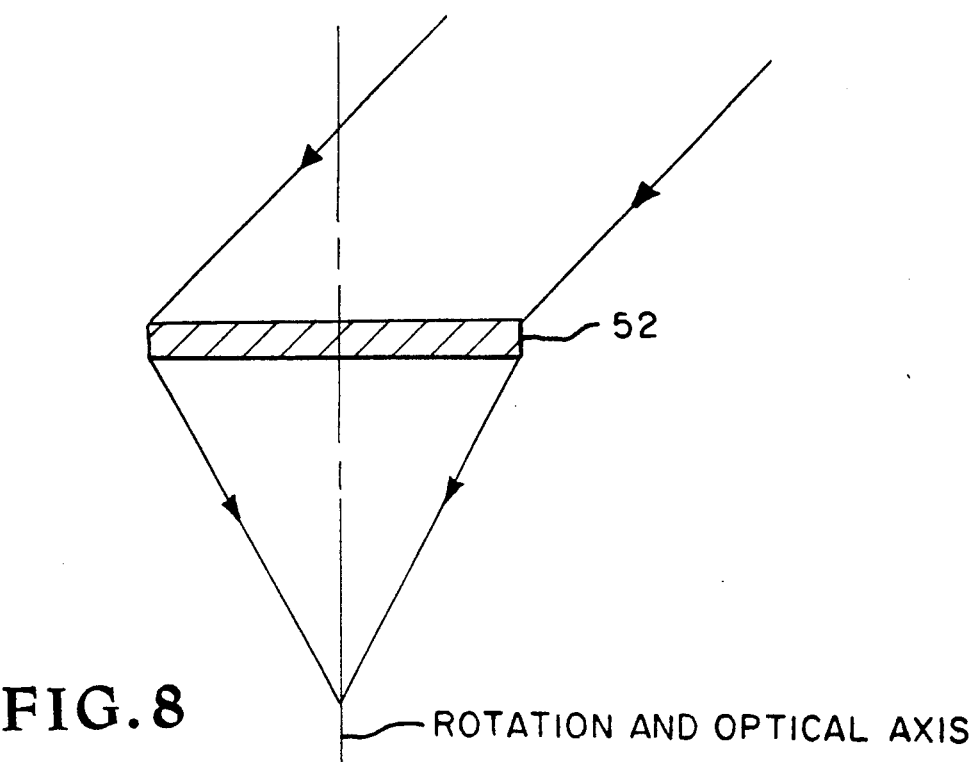
FIG. 8 — ROTATION AND OPTICAL AXIS
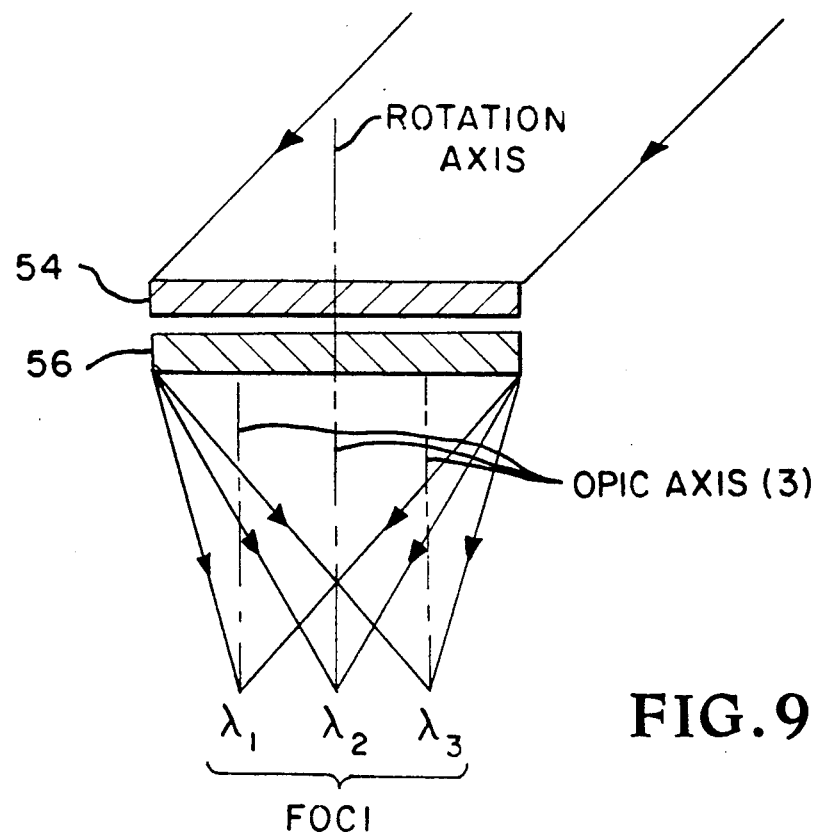
FIG. 9

CONICALLY SCANNED HOLOGRAPHIC LIDAR TELESCOPE

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates to Holographic Optical Elements (HOE) and more particularly to a scanning telescope that employs an HOE spinning in a plane which allows conical scanning of a light source in transmission and reception.

BACKGROUND ART

The present holographic scanning telescope represents a brand new technique in remote sensing instrumentation, and an innovative application of a technology that has been developing along for the past twenty some years. Recent developments in HOE's using volume phase holograms enables the development of a new class of light-weight telescopes with specific advantages for lidar remote sensing instruments. In particular, a large aperture, narrow field of view telescope used in a conical scanning configuration can be constructed with a much smaller rotating mass compared to conventional designs which require scanning either the entire telescope assembly including the primary mirror, secondary, baffling, and the detector package or rotating a separate flat scanning mirror which is larger in size than the primary collection optic. Because laser remote sensing systems utilize a spectrally narrow wavelength band or bands and require optical blocking and interference filters to reject unwanted wavelengths, especially scattered solar radiation, the holographic telescope can be made to diffract only a narrow wavelength band or bands thus reducing or even eliminating the requirements for optical blocking and interference filters.

An HOE is essentially a hologram of a lens or curved mirror. It is a diffractive optic that has optical power, that is, the ability to form images. The hologram itself usually consists of a film emulsion containing a diffraction pattern as a surface relief or as index modulation throughout the thickness of the film as in the volume phase hologram. It may be fixed to a planer substrate or to one that has curvature contributing to the optical power. Being a diffractive optic, an HOE has spectral dispersion which can be utilized to advantage in a lidar system in which only one or more particular laser wavelengths are being observed. The device described herein may also be applied to advantage in passive instruments requiring spectral filtering or dispersion.

STATEMENT OF THE INVENTION

It is therefore an object of the present invention to provide a light weight large aperture (1 meter diameter or greater), narrow field of view scanning telescope, particularly useful for lidar applications.

Another object of this invention is to provide a device to focus a large collimated beam of light to a stationary focal point while rotating an HOE to observe light coming from various directions.

These and other objects are achieved by providing an HOE imbedded in the receiver of an optical system which is the optical antenna or collector. Prior art in this area has not previously used HOE's, but rather conventional reflective or refractive optics, with scanners that rotate out of the plane of the scanning optic. What is unique about this invention is that it provides a device which is capable of collecting light over its entire aperture and focusing it to a small spot which will not move when the device is rotated. This spot may or may not lie on the rotation axis of the HOE, but in the preferred embodiment it does lie on the rotation axis of the HOE because this reduces the dynamic torque and any requisite balancing on the system. In addition the ability to focus various wavelengths along the optic axis to separate detectors is unique. None of the spots will move when the HOE rotates. This creates a compact system for wavelength multiplexing and demultiplexing.

BRIEF DESCRIPTION OF THE DRAWINGS

FIG. 8 is also a illustration of an alternate embodiment of the HOE arrangement in the present invention.

FIG. 9 is also an illustration of an alternate embodiment of the HOE arrangement in the present invention.

DETAILED DESCRIPTION OF THE INVENTION

Figure 1:
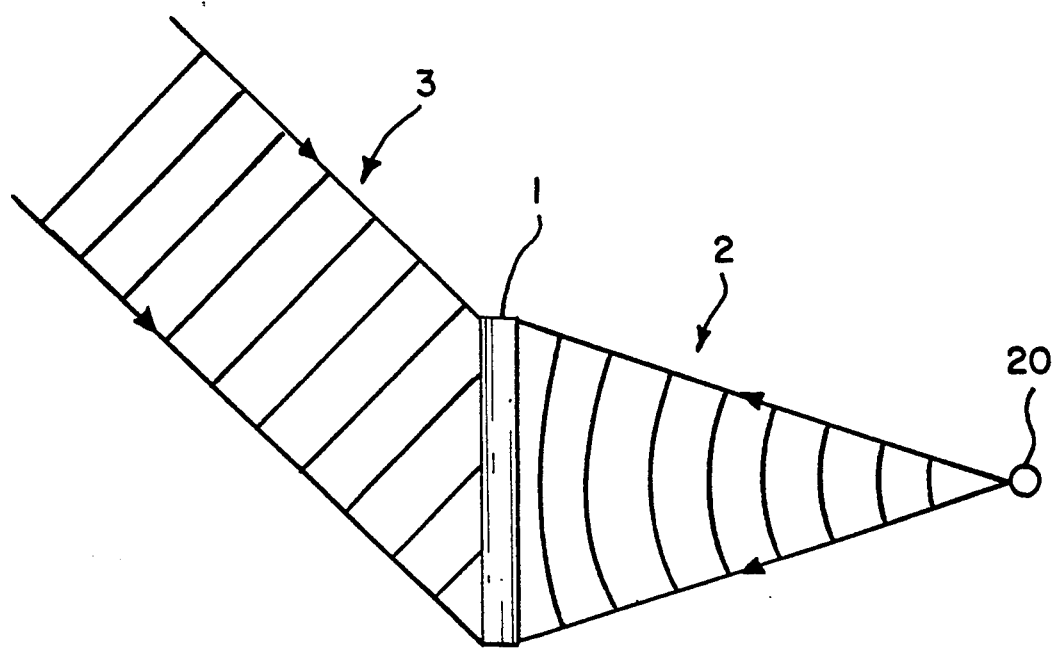
FIG. 1 is an illustration of the production of a conventional HOE.

Referring now to FIG. 1, an illustration of the production of a conventional HOE is shown in its simplist form. As those skilled in the art will recognize, HOE 1 is produced in a film emulsion deposited on an optically transparent substrate, by the interference of two mutually coherent laser beams 2 and 3. Beam 2, generally referred to as the object beam, contains spherical wavefronts emanating from a point source 20. The second is a collimated beam 3, generally referred to as the reference beam, containing plane wavefronts. After exposure to beams 2 and 3, the photo-sensitive material, typically ammonium dichromate, is washed from the emulsion and the film's interference pattern fixed by chemical processing commensurate with the type of film emulsion used. For example, in dichromated gelatin, the photo-exposed regions produce chemical crosslinks which increase the gelatin hardness and refractive index. This aspect of the instant invention follows well established procedures for producing HOE'S.

Figure 2:
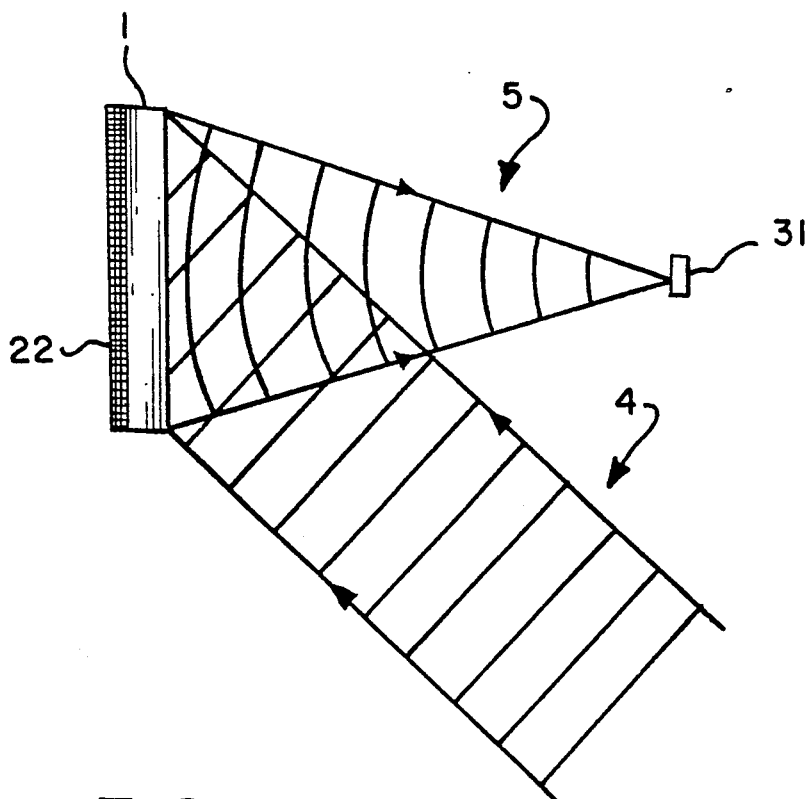
FIG. 2 is an illustration of the use of an HOE in a lidar application.

Referring now to FIG. 2, an illustration of the use of HOE 1 in a lidar application is shown. Laser light backscattered by the earth's atmosphere acts as a reconstruction beam 4, which is conjugate to the original reference beam 3. Properly made, HOE 1 will diffract most of the desired laser radiation into a converging beam 5, which is the conjugate of the original object beam 2, and is brought to a focus on a detector 31 as shown. Background light at wavelengths outside the diffraction bandpass of HOE 1 is transmitted undiffracted through HOE 1 to be trapped by a black absorber 22 on the rear surface of HOE 1. Thus, scattered light in the receiver is minimized by the use of the holographic optic instead of a reflective optic. A field stop (not shown), if desired, in the focal plane, would further limit the bandpass of the light reaching detector 31, as well as light at the laser wavelength that falls outside of the field of view.

Figure 3:
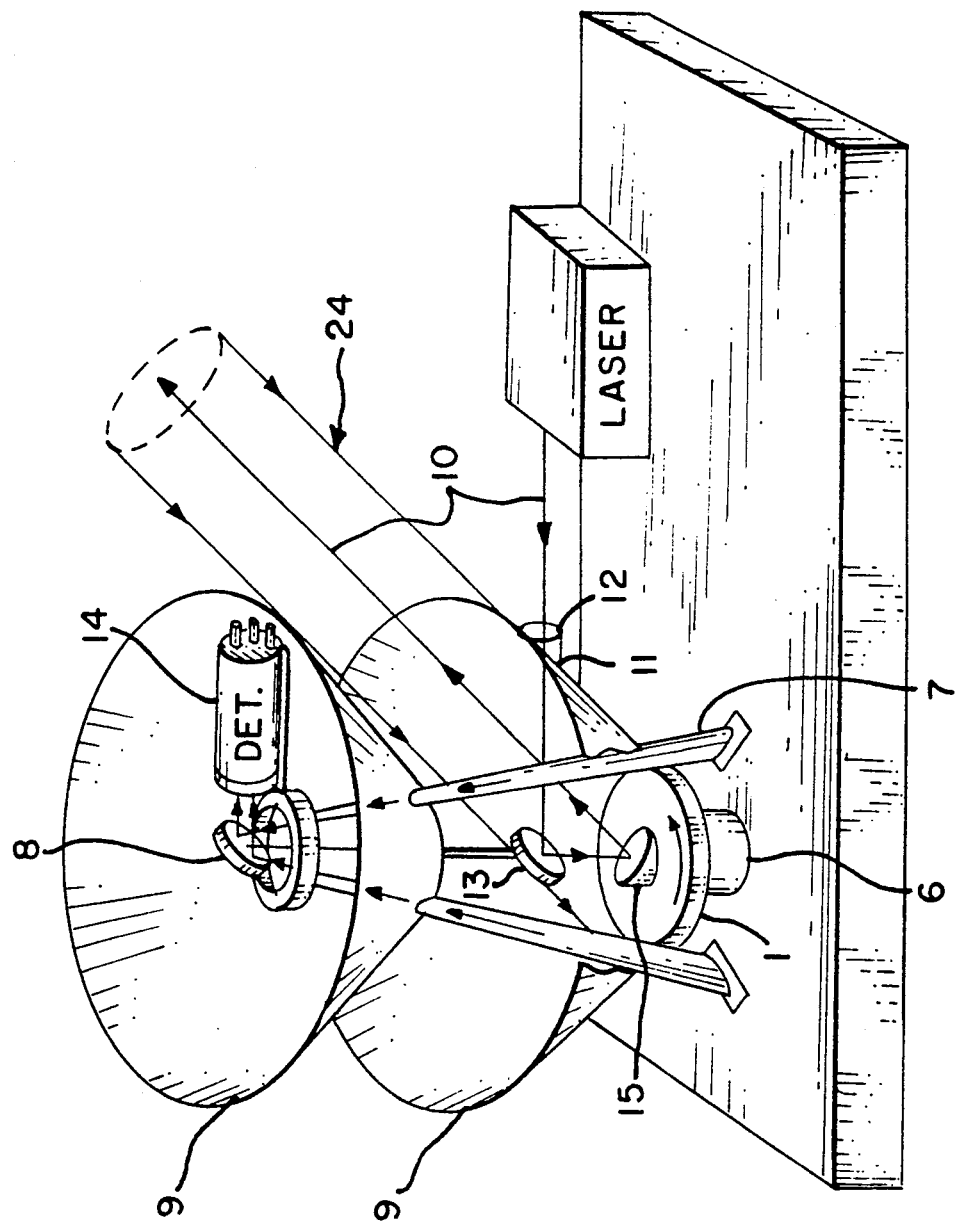
FIG. 3 is an illustration of a Conically Scanned Holographic Lidar Telescope according to the teachings of the present invention.

The basic design for a Conically Scanned Holographic Lidar Telescope according to the present inventive concepts is shown in FIG. 3. In this design, flat, rotating HOE 1 replaces the primary mirror in a conventional lidar telescope. HOE 1 is designed so that the field of view (for the specific narrow band of wavelengths about the laser transmitter wavelength) is at an angle (in this example, 45°) with the axis of rotation of HOE 1. HOE 1 is made with its optical axis on a perpendicular line through its center and coincides with the rotation axis of HOE 1. Thus, the field of view sweeps out in a conical scan. However, instead of a bulky, cantilevered large mirror and support structure being rotated, spinning HOE 1 will accomplish the scanning, focusing, and part of the optical filtering. HOE 1 and its associated motor 6 (and angular momentum compensating flywheel for spacecraft use) will be the only moving components of this telescope, allowing a significantly lighter structure 7 for supporting any secondary optic 8, (which may also be an HOE) and baffling 9, both of which remain static.

In a lidar operation, an outgoing laser beam 10, is transmitted through a hole 11 in lower baffling 9, through f-matching optics 12, to a folding mirror 13, positioned above HOE 1, which deflects beam 10 to HOE 1. Laser beam 10 is collimated by and diffracted off the center of HOE 1, to be transmitted coaxially along the receiver's field of view 24. In systems in which the transmitted laser energy is too high for normal HOE materials, a small high energy mirror 15 may be attached to the center of HOE 1 so as to reflect transmitted beam 10 into the proper direction to match the field of view of HOE 1. To prevent scattered light from transmitted laser beam 10 from getting into the receiver detector 14, two additional conically shaped baffles (not shown) may be added to the system nested between the principal baffles 9 so as to act as a conduit for the outgoing laser beam.

Multiple wavelength systems may be produced in a variety of ways. Multiple HOE's may be produced in the same film, each responding to a different laser wavelength or atmospheric Raman shifted wavelength. Alternatively, individual HOE's may be sandwiched one on top the other, each transparent to the other wavelengths but diffracting the single wavelength of its design. Multiple HOE's may occupy separate areas of the substrate, such as pie shaped or annular ring areas. This technique is not as efficient as overlapping HOE's, but may be required in systems where the disparity of the wavelengths may be such that the HOE material for one may not be compatible with the others, for example in using 10 micron $CO_2$ laser radiation with visible laser wavelengths.

Figure 4:
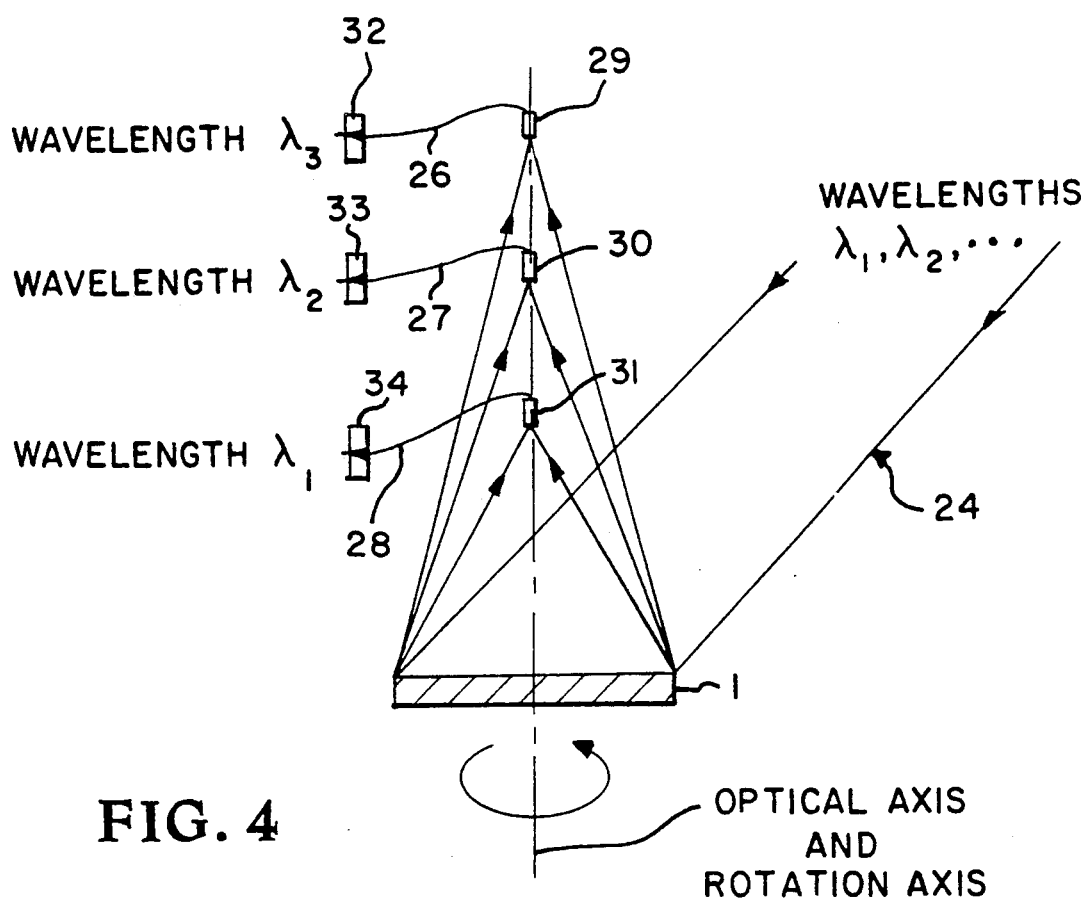
FIG. 4 is an illustration of a configuration in which multiple wavelengths are employed in a lidar receiver system with each wavelength diffracted with an HOE of a unique focal length.

FIG. 4 is an example of a configuration in which multiple wavelengths are employed in a receiver system, and each wavelength is diffracted with an HOE 1 of a unique focal length. Hence the different wavelengths are separated along a common optical axis which is also the axis of rotation of HOE 1. This arrangement facilitates keeping the foci 29, 30 and 31 stationary, while HOE 1 rotates and the field of view sweeps out a cone in the viewing space. Optical fibers 26, 27 and 28 can be employed to carry the light to the individual detectors 32, 33 and 34 so as to minimize the amount of obscuration of the longer focal length images by the detectors. Note that the entire area of HOE 1 may be responsive to each wavelength, or different areas of HOE 1 may be responsive to different wavelengths (e.g., segments or annuli). In either case, focal positions will not move when HOE 1 is rotated about the optical axis which is centered on HOE 1.

Figure 5:
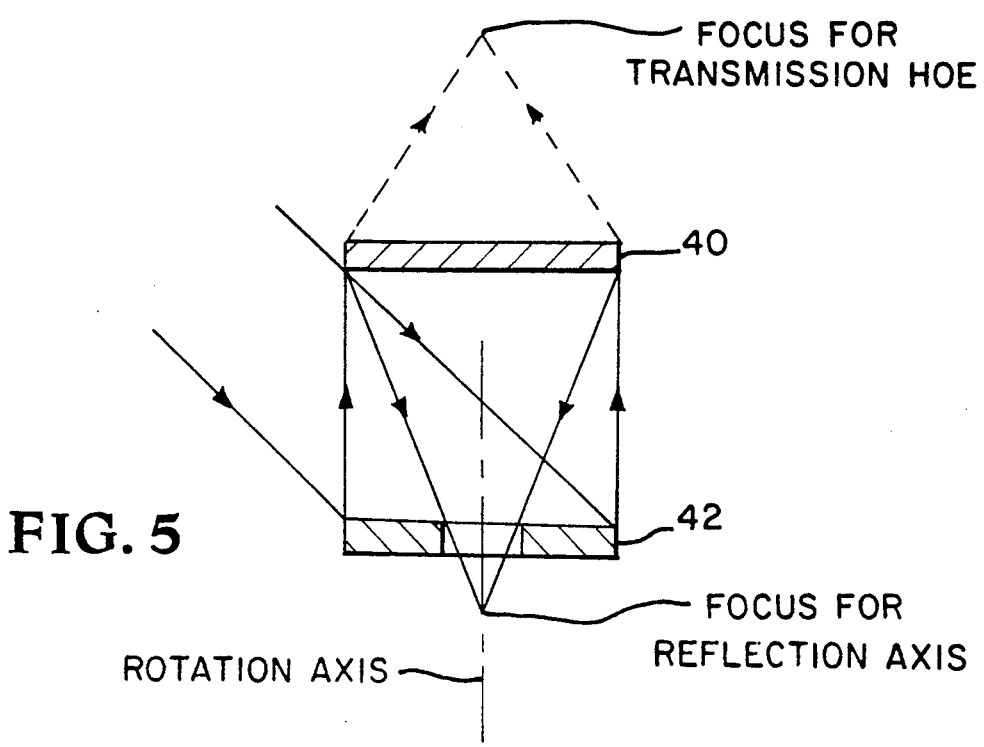
FIG. 5 is an illustration of an alternate embodiment of the HOE arrangement in the present invention.

Alternate embodiments of the arrangement of the HOE's is shown in FIGS. 5-9. In FIG. 5, a configuration is shown of a holographic scanning telescope using a reflection HOE 42 (having infinite focal length) for the rotating scanner and a reflection HOE 40 (or mirror) for the collecting optic (solid rays), or a transmission HOE 40 or lens for the collecting optic (dashed rays). The collecting optic may also perform wavelength separation either on-axis or off-axis.

Figure 6:
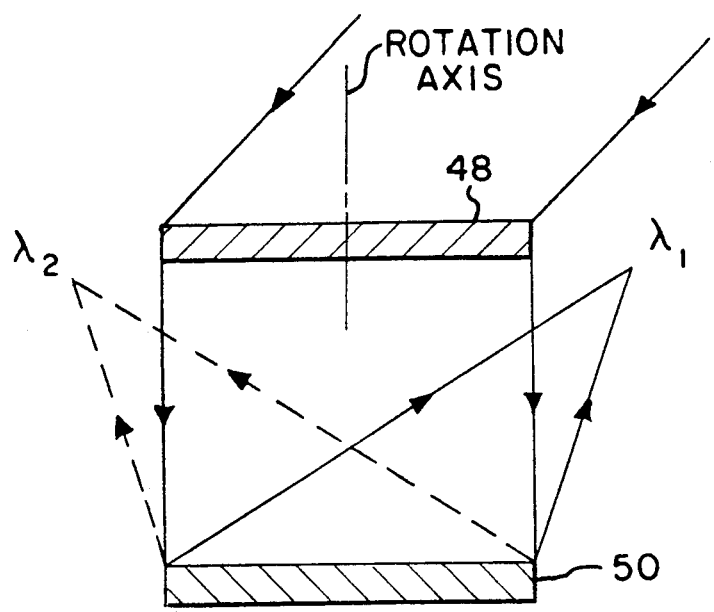
FIG. 6 is also an illustration of an alternate embodiment of the HOE arrangement in the present invention.
Figure 7:
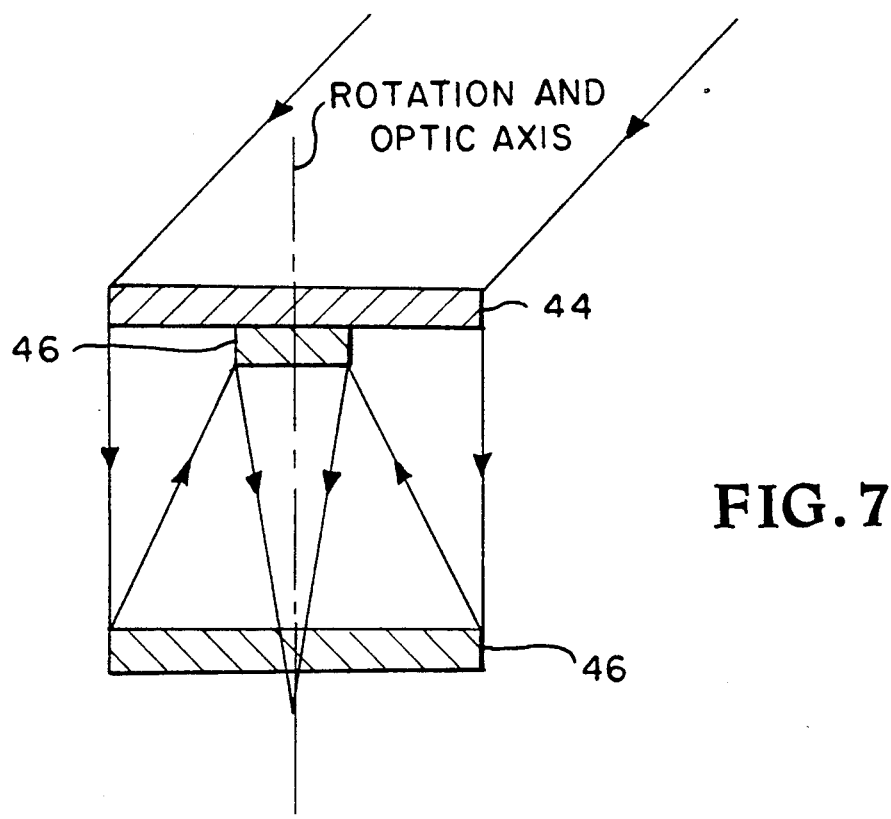
FIG. 7 is also an illustration of an alternate embodiment of the HOE arrangement in the present invention.

FIGS. 6 and 7 show holographic telescope configurations combining a rotating transmission HOE scanner (which may contain aberration correction) and a reflection HOE(s) or conventional mirror(s) for focusing. FIG. 7 shows a cassegrain configuration having a rotating scanner HOE 44 and reflection HOE's 46 (or mirrors) while FIG. 6 shows an off-axis configuration having a rotating scanner HOE 48 and a collector HOE 50 (or off-axis parabolic mirror). In the off-axis configuration, the foci of different wavelengths may be positioned at various locations around the periphery of the system, totally unobscured by each other.

FIG. 8 shows a transmission HOE 52 combining functions of scanner and collecting (focusing) optics that has the advantage of large cost and weight savings. FIG. 9 shows a wavelength multiplexed holographic telescope with one transmission HOE 54 providing the scanning function and one transmission HOE 56 providing the collecting and wavelength division functions. The advantage of this arrangement is that the detectors are unobscured and stationary.

The development of this technology will allow larger optical and infrared planetary and earth observing telescopes to be deployed while at the same time offering significant weight savings over existing telescope mirror technology. It is quite conceivable that this technology will also find use in multichannel passive instruments.

Those features of this invention which are new are the use of an HOE in a conically scanned telescope, having a stationary HOE optic axis, the design of the baffling, secondary, and support structure to facilitate conical scanning while rotating only the HOE, and the arrangement of multiple foci along the optical axis to facilitate the use of static focal plane optics and detectors and multiple wavelengths while performing the conical scanning. The use of multiple HOE's utilizing the same substrate and responsive to different wavelengths in an annular area configuration is also a new innovation.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. An optical scanning device comprising:
   a source of optical energy;
   a rotating holographic optical element having a stationary focus, said holographic optical element diffracting said source of optical energy at an angle to said rotation axis so as to define a conical scanning area;
   means for supporting and rotating said rotating holographic optical element;
   a laser transmitting a beam of light to said rotating holographic optical element, said beam of light diffracted by said rotating holographic optical element and thereby emanating outward from said rotting holographic optical element in a conical manner; and
   a small high damage threshold mirror attached to the center of said rotating holographic optical element.

2. The device of claim 1 wherein said stationary focus is located on the axis of rotation of said holographic optical element.

3. The device of claim 1 further comprising a detector means located at said stationary focus of said rotating holographic optical element.

4. The device of claim 3 wherein said source of optical energy comprises laser light backscattered from the earth's atmosphere.

5. The device of claim 3 wherein said source of optical energy comprises a natural source of light.

6. The device of claim 5 wherein said natural source of light comprises backscattered solar light.

7. The device of claim 1 further comprising a folding mirror positioned above said rotating holographic optical element.

8. The device of claim 1 further comprising f-matching optics located between said laser and said rotating holographic optical element.

9. The device of claim 2 further comprising secondary optics located on said axis of rotation of said rotating holographic optical element.

10. The device of claim 9 further comprising stationary baffling surrounding said rotating holographic optical element.

11. The device of claim 1 wherein said means for supporting and rotating said rotating holographic optical element comprises a motor means.

12. The device of claim 11 further including an angular momentum compensating flywheel.

13. An optical scanning device comprising:
    a source of optical energy;
    a plurality of rotating holographic optical elements each having a stationary focus, said plurality of holographic optical elements each diffracting a particular wavelength of said source of optical energy at an angle to said rotation axis so as to define a conical scanning area;
    means for supporting said rotating said plurality of rotating holographic optical element;
    said plurality of rotating holographic optical elements comprises individual holographic optical elements sandwiched one on top of the other, each transparent to the others wavelengths but diffracting the single wavelength of its design.

14. The device of claim 13 wherein said plurality of rotating holographic optical element comprises multiple holographic optical element produced in the same film.

15. The device of claim 13 wherein said plurality of rotating holographic optical elements occupy separate areas of a substrate in a pie shaped or annular ring fashion.

* * * * *